(12) United States Patent
Berdichevsky

(10) Patent No.: US 7,775,528 B2
(45) Date of Patent: Aug. 17, 2010

(54) BI-DIRECTIONAL PATTERN FOR DYNAMIC SEALS

(75) Inventor: Alexander Berdichevsky, Farmington Hills, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 11/697,130

(22) Filed: Apr. 5, 2007

(65) Prior Publication Data

US 2007/0187905 A1    Aug. 16, 2007

Related U.S. Application Data

(63) Continuation-in-part of application No. 11/352,627, filed on Feb. 13, 2006.

(51) Int. Cl.
*F16J 15/32*    (2006.01)

(52) U.S. Cl. .................................................. 277/559

(58) Field of Classification Search ............... 277/559, 277/400, 570, 552
See application file for complete search history.

(56) References Cited

U.S. PATENT DOCUMENTS

| | | | |
|---|---|---|---|
| 2,635,907 A | 4/1953 | Heimbuch | |
| 2,697,623 A | 12/1954 | Mosher | |
| 2,731,284 A | 1/1956 | Chambers, Jr. et al. | |
| 2,736,583 A | 2/1956 | Marvin | |
| 2,736,585 A | 2/1956 | Riesing | |
| 2,736,586 A | 2/1956 | Riesing | |
| 2,743,950 A | 5/1956 | Helfrecht et al. | |
| 2,797,944 A | 7/1957 | Riesing | |
| 3,049,356 A | 8/1962 | Talamonti | |
| 3,356,376 A | 12/1967 | Bradfute et al. | |
| 3,497,225 A | 2/1970 | Workman | |
| 3,534,969 A | * 10/1970 | Weinand | 277/309 |
| 3,572,734 A | 3/1971 | Holt | |
| 3,638,957 A | * 2/1972 | Marsi | 277/400 |
| 3,822,890 A | 7/1974 | Bourgeois | |
| 3,923,315 A | * 12/1975 | Hadaway | 277/559 |
| 3,934,888 A | * 1/1976 | Lutz | 277/559 |
| 3,941,396 A | 3/1976 | Bailey et al. | |

(Continued)

FOREIGN PATENT DOCUMENTS

EP    0128645    12/1984

(Continued)

OTHER PUBLICATIONS

*The journal of Teflon*, vol. 11, No. 1 (Jan.-Feb. 1970), Advances in Radial Lip Seals of "Teflon", pp. 2-4.

*Primary Examiner*—Alison K Pickard
(74) *Attorney, Agent, or Firm*—Ronald W. Wangerow, Esq.; Harness, Dickey & Pierce, P.L.C.

(57) ABSTRACT

A bi-directional dynamic seal advantageously provides for the return of captured lubricant to the lubricant side regardless of a direction of relative rotation between the seal and the shaft. The seal utilizes a pattern of symmetrical pumping elements to facilitate the hydrodynamic pumping of the captured lubricant in response to the relative rotation. The symmetrical pumping elements have ending points that stop short of the seal edge of the seal. The seal may utilize secondary pumping elements that communicate with the primary pumping elements to capture lubricant that is not captured by the primary pumping elements.

35 Claims, 7 Drawing Sheets

U.S. PATENT DOCUMENTS

| | | | |
|---|---|---|---|
| 3,984,113 A | 10/1976 | Bentley | |
| 3,988,078 A | 10/1976 | Barker | |
| 4,008,014 A | 2/1977 | Staebler | |
| 4,037,849 A | 7/1977 | Thumm | |
| 4,055,106 A | 10/1977 | Frey | |
| 4,084,826 A * | 4/1978 | Vossieck et al. | 277/559 |
| 4,106,781 A | 8/1978 | Benjamin et al. | |
| 4,111,436 A | 9/1978 | Yazawa et al. | |
| 4,118,856 A * | 10/1978 | Bainard et al. | 29/511 |
| 4,119,324 A | 10/1978 | Denton et al. | |
| 4,132,421 A * | 1/1979 | Corsi et al. | 277/565 |
| 4,256,208 A | 3/1981 | Najer et al. | |
| 4,274,641 A | 6/1981 | Cather, Jr. | |
| 4,344,631 A | 8/1982 | Winn | |
| 4,449,717 A | 5/1984 | Kitawaki et al. | |
| 4,451,050 A | 5/1984 | Repella | |
| 4,487,561 A | 12/1984 | Eiermann et al. | |
| 4,497,496 A * | 2/1985 | Repella | 277/559 |
| 4,501,431 A | 2/1985 | Peisker et al. | |
| 4,585,236 A | 4/1986 | Simmons et al. | |
| 4,635,947 A | 1/1987 | Hatayama | |
| 4,705,277 A * | 11/1987 | Repella | 277/559 |
| 4,844,484 A | 7/1989 | Antonini et al. | |
| 4,845,828 A | 7/1989 | Reed | |
| 4,986,553 A | 1/1991 | Preston et al. | |
| 4,995,621 A | 2/1991 | Devouassoux et al. | |
| 5,002,289 A * | 3/1991 | Yasui et al. | 277/559 |
| 5,004,248 A | 4/1991 | Messenger et al. | |
| 5,009,583 A | 4/1991 | Carlsson et al. | |
| 5,118,267 A | 6/1992 | Dollhopf et al. | |
| 5,190,440 A | 3/1993 | Maier et al. | |
| 5,195,757 A * | 3/1993 | Dahll | 277/559 |
| 5,201,531 A * | 4/1993 | Lai | 277/400 |
| 5,292,199 A | 3/1994 | Hosbach et al. | |
| 5,370,404 A | 12/1994 | Klein et al. | |
| 5,498,007 A * | 3/1996 | Kulkarni et al. | 277/400 |
| 5,509,667 A | 4/1996 | Klein et al. | |
| 5,664,787 A | 9/1997 | Fuse et al. | |
| 5,692,757 A | 12/1997 | Straub | |
| 5,755,446 A | 5/1998 | Dean et al. | |
| 5,791,658 A | 8/1998 | Johnston | |
| 5,860,656 A * | 1/1999 | Obata et al. | 277/559 |
| 5,957,461 A | 9/1999 | Ulrich | |
| 6,168,164 B1 * | 1/2001 | Toth et al. | 277/559 |
| 6,170,083 B1 | 1/2001 | Adl-Tabatabai | |
| 6,350,732 B1 | 2/2002 | Moore et al. | |
| 6,400,917 B2 | 6/2002 | Nakazato et al. | |
| 6,420,801 B1 | 7/2002 | Seefeldt | |
| 6,428,013 B1 | 8/2002 | Johnston et al. | |
| 6,520,507 B2 | 2/2003 | Pataille et al. | |
| 6,601,855 B1 | 8/2003 | Clark | |
| 6,702,293 B2 | 3/2004 | Endo et al. | |
| 6,726,213 B2 * | 4/2004 | Wang | 277/400 |
| 6,729,624 B1 * | 5/2004 | Johnston | 277/560 |
| 6,860,486 B2 | 3/2005 | Hacker et al. | |
| 7,004,471 B2 | 2/2006 | Bryde et al. | |
| 7,044,470 B2 * | 5/2006 | Zheng | 277/400 |
| 7,134,669 B2 | 11/2006 | Uhmer | |
| 2003/0006563 A1 | 1/2003 | Cater et al. | |
| 2003/0230850 A1 | 12/2003 | Bruyere et al. | |
| 2006/0022414 A1 | 2/2006 | Balsells | |
| 2007/0187903 A1 * | 8/2007 | Berdichevsky | 277/559 |

FOREIGN PATENT DOCUMENTS

| | | |
|---|---|---|
| EP | 0286211 B1 | 10/1988 |
| EP | 0432287 B1 | 6/1991 |
| EP | 0447766 A2 | 9/1991 |
| EP | 0564153 B1 | 10/1993 |
| EP | 0657641 A2 | 6/1995 |
| EP | 0684413 B1 | 11/1995 |
| EP | 0771398 B1 | 5/1997 |
| EP | 0792426 B1 | 9/1997 |
| EP | 0879977 B1 | 11/1998 |
| EP | 1026428 A2 | 8/2000 |
| WO | 9602777 | 2/1996 |

* cited by examiner

BI-DIRECTIONAL PATTERN FOR DYNAMIC SEALS

CROSS-REFERENCE TO RELATED APPLICATIONS

This application is a continuation-in-part of U.S. patent application Ser. No. 11/352,627, filed on Feb. 13, 2006, the disclosure of which is incorporated herein by reference.

FIELD OF THE INVENTION

The present invention relates to dynamic seals, and more particularly, to bi-directional pumping patterns for dynamic seals.

BACKGROUND AND SUMMARY OF THE INVENTION

Rotary shaft seals have been used in machinery, the automotive industry, as well as other industries. For example, such applications can include use on transmissions, pinions, gears, axles, etc. that require a symmetrical functioning dynamic seal (i.e., the seal must function effectively in both directions of shaft rotation). The seal has an air side and a lubricant side. The seal helps maintain the lubricant (e.g. oil) on the lubricant side. Lubricant may, however, leak from a lubricated side to the non-lubricated (air) side through the interaction of the active surface of the seal with the shaft. Spiral grooves or built-up ribs (hereinafter collectively referred to as grooves) disposed on the active side of the seal capture the leaked lubricant and hydrodynamically pump the lubricant back into the lubricated side due to relative rotation between the seal and the shaft about which the seal is disposed.

Typically, the grooves are arranged in a spiral or helical configuration on the shaft-contacting side of the seal. In order to enable hydrodynamic pumping of captured lubricant, the grooves spiral along the active surface of the seal in opposite directions to accommodate relative rotation between the shaft and the seal regardless of the direction of the relative rotation. The grooves are open at the lubricant side of the seal and communicate with the lubricant therein. Having the grooves open at the lubricant side of the seal creates potential problems. For example, static oil leaks can develop. Additionally, air leakage during pressurization testing of the machinery on which the seal is being used at the end of the assembly stage can also occur. Accordingly, it would be advantageous to provide a dynamic seal having a bi-directional pattern thereon to capture lubricant that leaks past the seal edge and returns the same to lubricant side of the seal. Furthermore, it would be advantageous if such a dynamic seal minimized and/or avoided the drawbacks mentioned above.

A dynamic seal according to the principles of the present invention advantageously provides for the return of captured lubricant to the lubricant side regardless of the direction of the relative rotation between the seal and the shaft. The seal uses symmetrical pumping elements to facilitate the hydrodynamic pumping of the captured lubricant in response to the relative rotation. The symmetrical pumping elements have ending points that stop short of the seal edge of the seal. The seal may utilize secondary pumping elements that communicate with the primary pumping elements to capture lubricant that is not captured by the primary pumping elements. The secondary stage pumping elements capture the excess lubricant and deliver and transfer the lubricant to the primary stage pumping elements for subsequent hydrodynamic pumping back into the lubricant side of the seal.

In one aspect of the present invention, a bi-directional dynamic seal includes a lubricant side and a non-lubricant side. There is a sealing portion having an active surface that communicates with the non-lubricant side and a seal lip at an end thereof. The seal lip faces the lubricant side. The seal lip defines an opening in which a shaft can be disposed. The active surface is operable to engage with and seal against a shaft disposed in the opening. A plurality of pumping elements extends along the active surface. The pumping elements stop short of the seal lip and there is a static dam therebetween. The pumping elements are operable to capture lubricant that leaks past the seal lip and pump the captured lubricant toward the seal lip, past the static dam and back into the lubricant side due to relative rotation between the active surface and the shaft disposed in the opening. The pumping occurs regardless of a direction of the relative rotation.

In another aspect of the present invention, a dynamic bi-directional seal includes an active surface operable to engage with and form a seal against a shaft. There is a seal lip that defines an opening which is operable to receive a shaft. A bi-directional fluid pumping pattern is located on the active surface and is operable to capture lubricant that leaks past the seal lip and pump captured lubricant to a lubricant side. The pumping pattern includes a plurality of primary pumping elements that extend along the active surface. Each primary pumping element has a pair of termination points adjacent the seal lip. Each primary pumping element also has an induction point remote from the seal lip. The pumping pattern also includes a plurality of secondary pumping elements extending along the active surface. The primary pumping elements are disposed between the secondary pumping elements and the seal lip. The secondary pumping elements are operable to capture lubricant that leaks past the primary pumping elements and direct captured lubricant to the induction points of the primary pumping elements.

In yet another aspect of the present invention, a method of returning lubricant that leaks past a seal edge of a seal on a shaft back to the lubricant side of the seal is disclosed. The method includes (1) capturing lubricant that leaks past the seal edge with a plurality of primary pumping elements on an active surface of the seal; (2) capturing lubricant that leaks past the primary pumping elements with a plurality of secondary pumping elements on the active surface of the seal, the primary pumping elements being disposed between the seal edge and the secondary pumping elements; (3) transferring lubricant captured in the secondary pumping elements to induction points of the primary pumping elements; and (4) pumping lubricant captured by and/or transferred to the primary pumping elements to the lubricant side of the seal with relative rotation between the active surface of the seal and the shaft regardless of a direction of the relative rotation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Reference indicia are used herein to point out or describe particular components, features or aspects of the present invention. When describing components, features or aspects of the various embodiments that are the same or similar to previously described components, features or aspects of a previous embodiment(s), the same reference indicia or the same reference indicia with the addition of a hundreds number to the original reference indicia is used. For example, the seal may be referred to as 20, 120, 220, 320, 420, 520 and 620 for the various embodiments disclosed herein.

Figure 1:
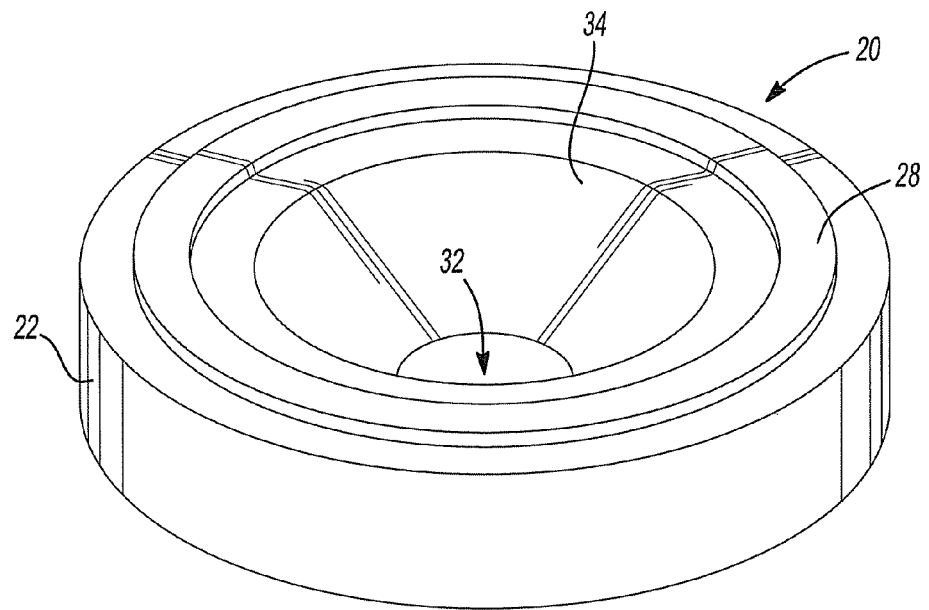
FIG. 1 is a simplified perspective view of the seal of the present invention.
Figure 2:
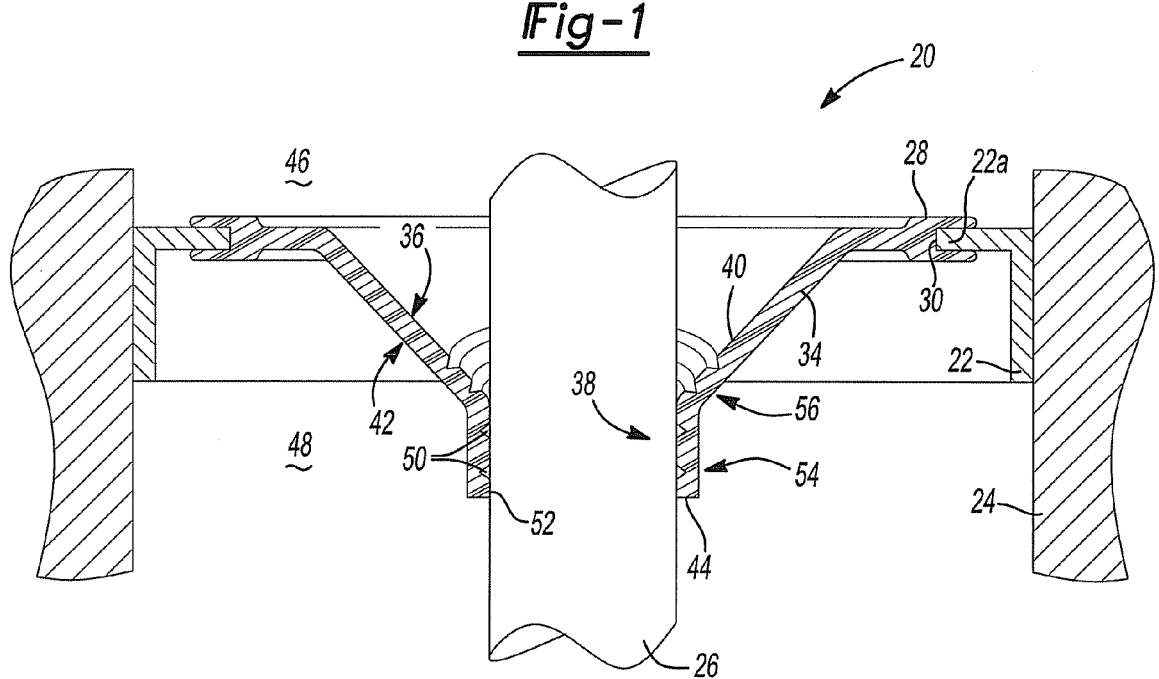
FIG. 2 is a cross-sectional view of the seal of FIG. 1 disposed around a shaft.

With reference to FIGS. 1 and 2, a dynamic bi-directional seal 20 according to the principles of the present invention is shown. Seal 20 is mounted to a casing 22 which is disposed in a fixed housing 24 in a manner which is well known in the art. Seal 20 engages a rotary shaft 26 and provides a sealed relationship between rotary shaft 26 and housing 24 in which casing 22 is disposed. With reference to FIG. 2, seal 20 includes a mounting portion 28 having an annular recess 30 therein. A mounting portion 22a of casing 22 resides within annular recess 30. It should be noted that mounting portion 28 and casing 22 can take on many shapes and forms and are not considered to be particularly relevant to the present invention. Mounting portion 28 is mounted to casing 22 which can be made of plastic or metal and mounting portion 28 can be bonded thereto according to well known mounting techniques.

Seal 20 includes a central opening 32 in which shaft 26 is disposed. The diameter of opening 32 is dimensioned to be less than the diameter of shaft 26 to provide a desired fit therebetween. That is, the portion of seal 20 proximate opening 32 will deform as seal 20 is positioned on shaft 26. The deformation of seal 20 is resisted and a seal is formed against shaft 26.

Seal 20 has a conically-shaped sealing portion 34 that extends axially and radially from mounting portion 28. Opening 32 is located in sealing portion 34. Sealing portion 34 has an active side/surface 36. Active surface 36 has an engaging portion 38 that engages with shaft 26 and a non-engaging portion 40. Sealing portion 34 also includes a non-active side/surface 42 that is opposite active surface 36. Non-active surface 42 does not engage with shaft 26. A leading seal edge or lip 44 separates active surface 36 and non-active surface 42. Active surface 36 is exposed to a non-lubricant or air side 46 of seal 20 while non-active surface 42 and seal edge 44 are exposed to a lubricant (e.g. oil) side 48 of seal 20.

Active surface 36 of seal 20 has a bi-directional pumping pattern that includes a plurality of pumping elements 50 that are disposed on engaging portion 38 and, in some embodiments, also on non-engaging portion 40. Pumping elements 50 are operable to capture lubricant that leaks past seal edge 44 and between shaft 26 and engaging portion 38 of active surface 36. Pumping elements 50 capture the leaked lubricant and hydrodynamically pump the lubricant back toward and into lubricant side 48 as a result of relative rotation between seal 20 and shaft 26, as described below. A static dam 52 is disposed between seal edge 44 and pumping elements 50 and seals against shaft 26. Static dam 52 separates the engineered region (region containing the pumping pattern) of active surface 36 from seal edge 44. Pumping elements 50 can be a plurality of grooves that are coined, cut into or otherwise formed along active surface 36. Alternatively, pumping elements 50 can be raised ribs that form channels therebetween to capture the leaked lubricant and hydrodynamically pump the same toward and into lubricant side 48 due to relative rotation between seal 20 and shaft 26. The ribs can be formed, molded or produced by other means along active surface 36. Thus, it should be appreciated that the term pumping elements can refer to either grooves, ribs or both along active surface 36 of seal 20.

Figure 3:
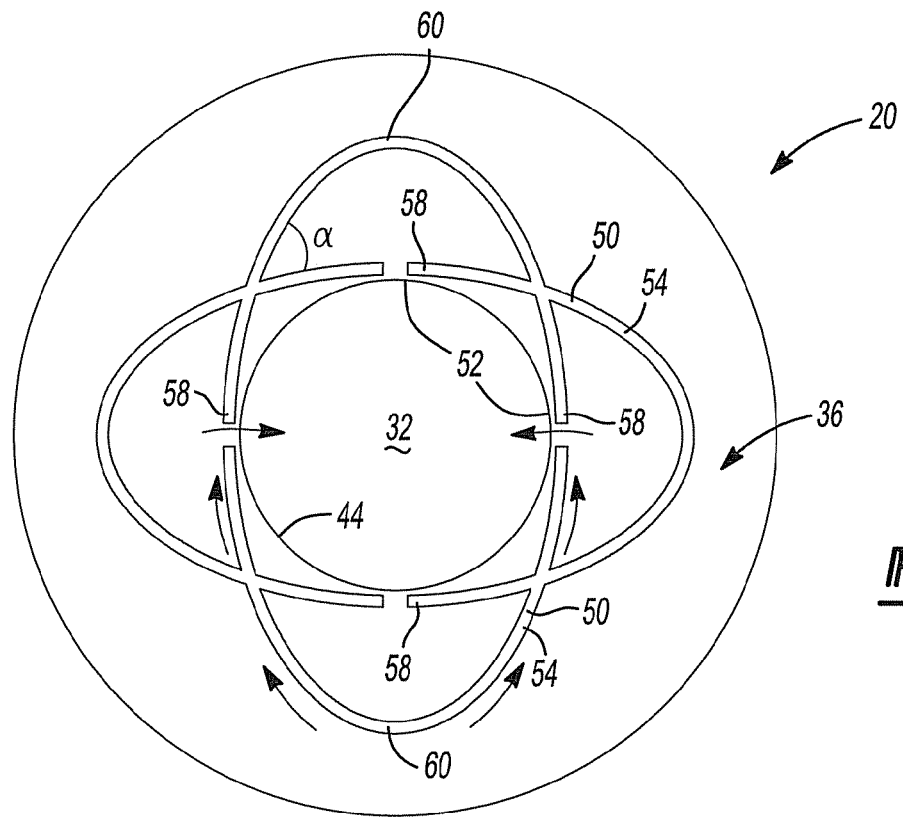
FIG. 3 is a schematic simplified representation of a top plan view of the active surface of the seal of FIG. 1 showing the first preferred embodiment of the bi-directional pattern on the active surface of the seal.

Pumping elements 50 are arranged on active surface 36 to provide a desired pattern that results in capturing the leaked lubricant and directing the same toward and into lubricant side 48. Pumping elements 50 are arranged so that a bi-directional pattern is formed and the pumping elements 50 are operable regardless of the direction in which the relative rotation between shaft 26 and seal 20 occurs. To accomplish this, pumping elements 50 are arranged in a substantially symmetrical orientation on active surface 36, as described below. Pumping elements 50 are staged in relation to a distance from seal edge 44. There can be one or more stages. The stage closest to seal edge 44 is called the primary stage 54 while the pumping elements 50 that are more remote from seal edge 44 are called secondary stages 56. For example, as shown in FIG. 3, the seal can include four primary stage pumping elements 54 and no secondary stage pumping elements. While the seal in FIG. 4 includes both primary stage pumping elements (the same as in FIG. 3) and a plurality of secondary stage pumping elements, as described below. The function of the primary stage pumping elements is to capture a leaked lubricant and direct the same toward and into lubricant side 48 of the seal. The function of the secondary stage pumping elements is to capture lubricant that leaks past the primary stage pumping elements and transport the captured lubricant back to the primary stage pumping elements for subsequent pumping and delivery back into lubricant side 48, as described below.

Preferably, each stage consists of identical pumping elements positioned in a symmetrical fashion along active surface 36 about central opening 32. There can be as few as two mutually-intersecting primary stage pumping elements 54 in the primary stage, such that each pumping element 50 embraces less than one full circle around central opening 32, and as many as needed. One of the factors to consider in the number of pumping elements within the primary stage is the seal height to shaft diameter relationship. The use of a secondary stage is optional, as described below. When a secondary stage is used, the number of secondary stage pumping elements 56 therein has no upper limit and can be as few as one.

Preferably, the primary stage pumping elements 54 are mostly within engaging portion 38 of active surface 36 (i.e., mostly in the area of direct contact between active surface 36 and shaft 26), but can also be in non-engaging portion 40. The secondary stage pumping elements 56 are preferably mostly within non-engaging portion 40 (i.e., mostly in the area of the gap between active surface 36 and shaft 26), but can also be in engaging portion 38.

Preferably, each primary stage pumping element 54 has a variable height (in the case of ribs) or a variable cross-sectional area (in the case of grooves) which reduces to zero as each pumping element approaches its termination points 58 adjacent static dam 52. The purpose of this variation is to cause a favorable increase in fluid pressure within the primary stage pumping elements 54 close to termination points 58. The maximum pressure reached at termination points 58 depends on the length of the pumping elements (length of the groove or volume of the wedge-like shape formed by the ribs) filled with the fluid. When the pressure exceeds the seal edge opening pressure, seal edge 44 and static dam 52 of engaging portion 38 of active surface 36 lifts off shaft 26 and the lubricant being pumped by primary stage pumping elements 54 is directed back into lubricant side 48. The dynamics of this cycle of pumping captured lubricant back into lubricant side 48 depends on numerous factors including the rate at which leaked lubricant is generated, the groove/rib geometry, seal edge opening pressure, material memory properties, etc. Two basic regimes can be envisioned—a steady state regime and a dynamic regime. A steady state regime forms when the leakage rate and the pump rate are statically balanced. The area of active surface 36 (static dam 52 and seal edge 44) most close to termination points 58 is then continuously open just enough to produce flow resistance sufficient to maintain permanent fluid residence in the groove/wedge formed by primary stage pumping elements 54. In the dynamic regime, seal edge 44 and static dam 52 adjacent termination points 58 experience periodic liftoffs from shaft 26 emptying the groove/wedge reservoir and returning the captured lubricant to lubricant side 48. A benefit of such a construction is that as long as the lubricant is present in the groove/wedge regions of primary stage pumping elements 54, lubrication is provided to seal edge 44 and static dam 52.

Referring now to FIG. 3, a first preferred embodiment of a bi-directional pattern of pumping elements on active surface 36 of seal 20 is shown. In the first preferred embodiment, all of the pumping elements are primary stage pumping elements 54. Preferably, each primary stage pumping element 54 is identical to one another and symmetrically positioned on active surface 36. Each primary stage pumping element 54 has two termination points 58 that are adjacent seal edge 44 with static dam 52 therebetween. In the first preferred embodiment, there are four identical arcuate primary stage pumping elements 54 each having two termination points 58 symmetrically positioned about a single induction point 60. Induction point 60 is the portion of the pumping element most remote from seal edge 44. The distance (in radial direction on FIGS. 3-7) between induction point 60 and termination points 58 defines the pitch of the pumping element. In primary stage pumping elements 54, the smaller the pitch—the higher the fluid pressure at the termination points 58, but the lower the axial fluid thrust. Inversely, the higher the pitch—the smaller the fluid pressure at the termination point 58 and the higher the axial fluid thrust. Thus, the pitch is selected based on interplay between the seal edge design 44, the material properties, and the pump rate that is needed. Primary stage pumping elements 54 are arranged on active surface 36 such that each pumping element embraces less than one full circle around seal edge 44. Preferably, primary stage pumping elements 54 are arranged such that lubricant escaping past seal edge 44 must encounter one or more primary stage pumping elements 54 before extending beyond engaging portion 38 of active surface 36. Primary stage pumping elements 54 have mutual intersections with one another as they extend between termination points 58. The captured lubricant within primary stage pumping elements 54 is pumped toward one of the termination points 58, based upon the direction of relative rotation between shaft 26 and seal 20. To facilitate smooth fluid flow to the termination point through the mutual intersection with other primary stage pumping elements 54, it is preferred that the intersection angle $\alpha$ between the pumping elements is an acute angle noticeably greater than zero degrees. When the captured lubricant reaches one of the termination points 58, the fluid pressure therein increases to a level exceeding that of the seal liftoff pressure (the pressure which seal edge 44 and static dam 52 lift off from shaft 26) and flow past static dam 52 and seal edge 44 into lubricant side 48.

Figure 4:
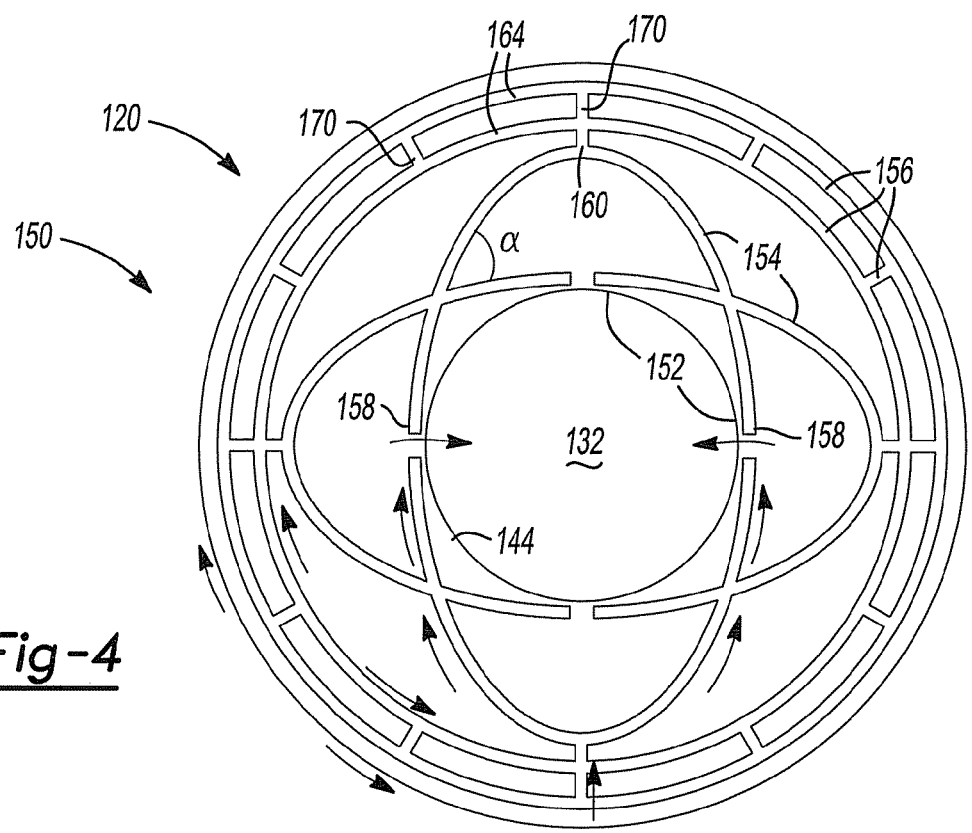
FIG. 4 is a schematic simplified representation of a top plan view of the active surface of the seal of FIG. 1 showing the second preferred embodiment of a bi-directional pattern on the active surface of the seal.

Referring now to FIG. 4, a bi-directional pattern of pumping elements 150 for seal 120 according to a second preferred embodiment of the present invention is shown. In the second preferred embodiment, secondary stage pumping elements 156 are utilized in addition to primary stage pumping elements 154. The secondary stage pumping elements 156 function to catch lubricant that leaks past the primary stage pumping elements 154 and transport that captured lubricant back into the primary stage pumping elements 154 for further pumping back to lubricant side 48. Secondary stage pumping elements 156 direct the captured lubricant therein to the induction points 160 of the primary stage pumping elements 154. Because induction points 160 are the most remote portion of the primary stage pumping elements 154 between termination points 158, this is a transition wherein relative rotation will cause the lubricant therein to flow toward one of the termination points 158 depending upon the direction of relative rotation. The number of secondary stage pumping elements 156 can vary from zero, such as in the first preferred embodiment, to multiple secondary stage pumping elements 156, as shown in FIG. 4. There is no upper limit to the number of secondary stage pumping elements 156 that can be employed.

Secondary stage pumping elements 156 extend primarily along non-engaging portion 40 of active surface 36 although some portion of secondary stage pumping elements 156 can extend along engaging portion 38 of active surface 36. The height (in the case of ribs) and the cross-sectional area (in the case of grooves) do not need to be changing, as in the preferred embodiments of the primary stage pumping elements. Rather, secondary stage pumping elements 156 can have a generally uniform height or cross-sectional area. It should be appreciated, however, that the height (in the case of ribs) and the cross-sectional area (in the case of grooves) may be configured to be changing to provide a favorable fluid pressure gradient within secondary stage pumping elements 156, if desired. The majority of the pumping force created by secondary stage pumping elements 156 is energized by air movement in the non-lubricated side 46 due to relative rotation between the shaft and the seal. It is anticipated that the pumping rate produced by secondary stage pumping elements 156 will be less than the pumping rate produced by the primary stage pumping elements. This is acceptable as the secondary stage pumping elements are expected to receive/capture lubricant at a slower rate than the primary stage pumping elements.

In the second preferred embodiment, secondary stage pumping elements 156 include two concentric radially-extending pumping elements 164 that are interconnected by a plurality of axially-extending pumping elements 166. Some of the axially-extending pumping elements 166 also communicate with induction points 160 on the primary stage pumping elements 154. Secondary stage pumping elements 156 thereby communicate with the induction points 160 of primary stage pumping elements 154 to route lubricant captured therein back to primary stage pumping elements 154.

Figure 5:
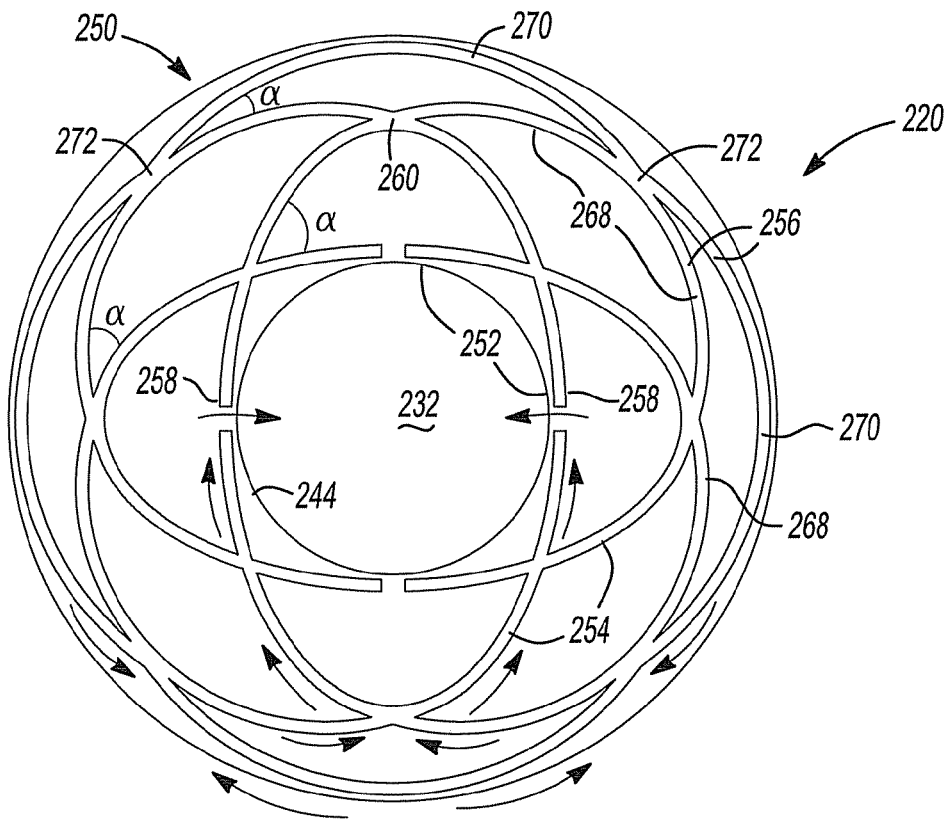
FIG. 5 is a schematic simplified representation of a top plan view of the active surface of the seal of FIG. 1 showing the third preferred embodiment of the bi-directional pattern on the active surface of the seal.

Referring now to FIG. 5, a bi-directional pattern for pumping elements 250 for seal 220 according to a third preferred embodiment of the present invention is shown. In the third preferred embodiment, the same primary stage pumping elements 250 as discussed above with reference to the first and second preferred embodiments are utilized. The secondary stage pumping elements 256, however, are different. Specifically, the secondary stage pumping elements 256 are arcuate and include two distinct sets of secondary stage pumping elements 256. A first set 268 of secondary stage pumping elements extends between and communicates with adjacent induction points 260 in adjacent primary stage pumping elements 254. A second set 270 of secondary stage pumping elements extend between adjacent induction points 272 of adjacent pumping elements in first set 268.

The arcuate shape of secondary stage pumping elements 256 causes lubricant therein to flow from second set 270 of secondary stage pumping elements to induction points 272 on first set 268 of secondary stage pumping elements. Lubricant within first set 268 of secondary stage pumping elements flows to the induction points 260 of primary stage pumping elements 254 which then subsequently flows to termination points 258. To facilitate the smooth transfer of lubricant within secondary stage pumping elements 256, it is preferred that the intersection angle α between first and second sets 268, 270 of secondary stage pumping elements and between first set 268 of pumping elements and primary stage pumping elements 254 be an acute angle noticeably greater than zero degrees. It should be appreciated that the intersection angle between first and second sets 268, 270 of secondary stage pumping elements can be different than the intersection angle between first set 268 of secondary stage pumping elements and primary stage pumping elements 254.

In the third preferred embodiment, the number of primary stage pumping elements 254 determines the number of pumping elements in first and second sets 268, 270 of secondary stage pumping elements. That is, because first set 268 of secondary stage pumping elements extend between adjacent induction points 260 of adjacent primary stage pumping elements 254, the same number of pumping elements are required in first set 268 as there are number of primary stage pumping elements 254. Likewise, with second set 270 of secondary stage pumping elements extending between induction points 272 on adjacent pumping elements in first set 268, the number of pumping elements in second set 270 is the same as the number of pumping elements in first set 268.

Figure 6:
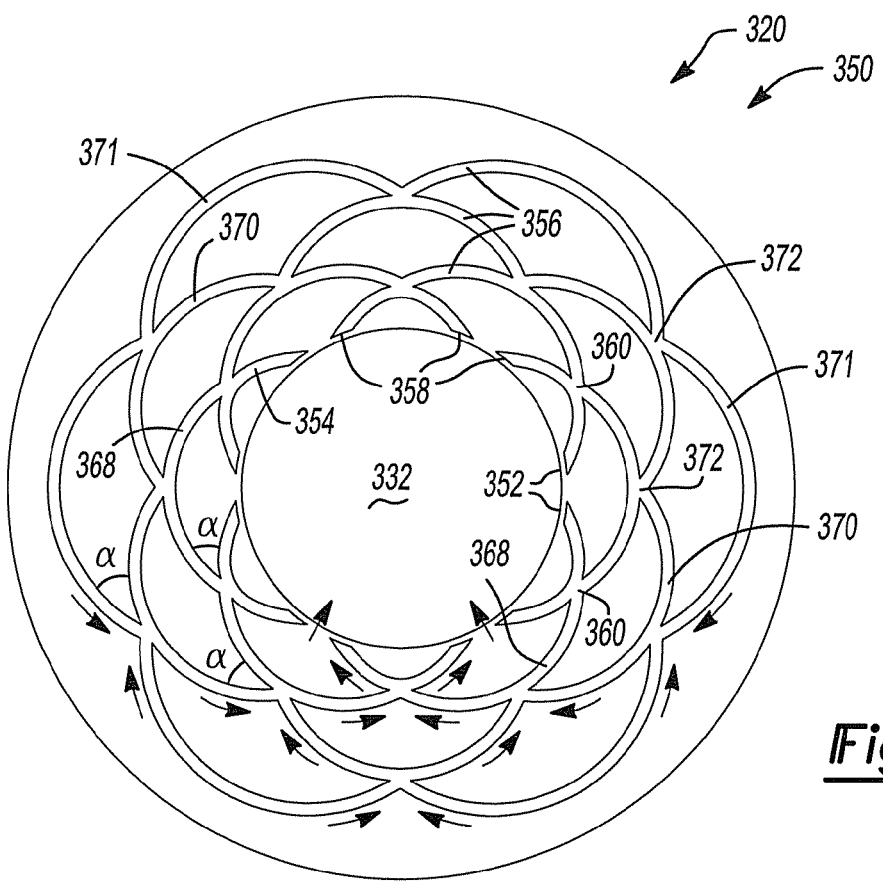
FIG. 6 is a schematic simplified representation of a top plan view of the active surface of the seal of FIG. 1 showing the fourth preferred embodiment of the bi-directional pattern on the active surface of the seal.

Referring now to FIG. 6, a bi-directional pattern for pumping elements 350 for seal 320 according to a fourth preferred embodiment of the present invention is shown. In the fourth preferred embodiment, six primary stage pumping elements 354 are utilized with each primary stage pumping element 354 extending along a smaller portion of active surface 336 of seal 320 than in the previous embodiments. Additionally, primary stage pumping elements 354 do not intersect with one another. In other regards, primary stage pumping elements 354 are substantially the same as the primary stage pumping elements discussed above with reference to the first, second and third preferred embodiments. The secondary stage pumping elements 356 are arcuate and include three distinct sets of secondary stage pumping elements 356. A first set 368 of secondary stage pumping elements extends between and communicates with adjacent induction points 360 in adjacent primary stage pumping elements 354. A second set 370 of secondary stage pumping elements extends between adjacent induction points 372 of adjacent pumping elements in first set 368. A third set 371 of secondary stage pumping elements extends between adjacent induction points 372 of adjacent pumping elements in second set 370.

The arcuate shape of secondary stage pumping elements 356 causes lubricant therein to flow from third set 371 of secondary stage pumping elements to induction points 372 on second set 370 of secondary stage pumping elements. Lubricant within second set 370 of secondary stage pumping elements flows to induction points 372 on first set 368 of secondary stage pumping elements. Lubricant within first set 368 of secondary stage pumping elements flows to induction points 360 of primary stage pumping elements 354 which then subsequently flows to termination points 358. To facilitate the smooth transfer of lubricant within secondary stage pumping elements 356, it is preferred that the intersection angle α between first, second and third sets 368, 370, 371 of secondary stage pumping elements and between first set 368 of pumping elements and primary stage pumping elements 354 be an acute angle noticeably greater than zero degrees. It should be appreciated that the intersection angle between first, second and third sets 368, 370, 371 of secondary stage pumping elements can each be different and can also be different than the intersection angle between first set 368 of secondary stage pumping elements and primary stage pumping elements 354.

In the fourth preferred embodiment, the number of primary stage pumping elements 354 again determines the number of pumping elements in first, second and third sets 368, 370, 371 of secondary stage pumping elements. That is, because each set of secondary stage pumping elements extends between adjacent induction points of adjacent primary stage pumping elements 354 or adjacent secondary stage pumping elements 356, the same number of pumping elements are required in each set of secondary stage pumping elements 356 as there are number of primary stage pumping elements 354.

Figure 7:
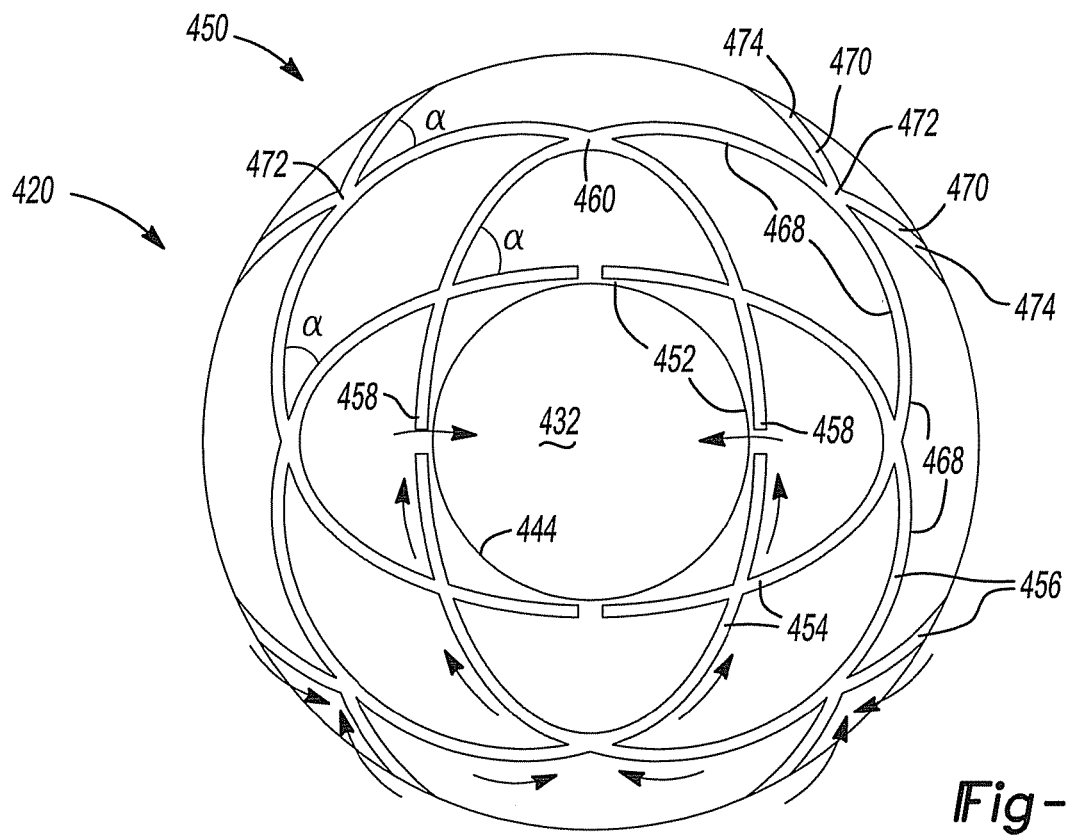
FIG. 7 is a schematic simplified representation of a top plan view of the active surface of the seal of FIG. 1 showing the fifth preferred embodiment of the bi-directional pattern on the active surface of the seal.

Referring now to FIG. 7, a bi-directional pumping pattern of pumping elements 450 for seal 420 according to a fifth preferred embodiment of the present invention is shown. The fifth preferred embodiment is similar to the third preferred embodiment with the difference being that the second set 470 of secondary stage pumping elements has open ends 474 and lack an induction point. First and second sets 468, 470 are still arcuate and symmetrical in nature and, thus, drive lubricant therein toward primary stage pumping elements 454 as a result of relative rotation between the shaft and the seal. Just like in the third preferred embodiment, the fluid within second set 470 of secondary stage pumping elements will be directed toward induction points 472 of first set 468 of secondary stage pumping elements. Fluid within first set 468 of secondary stage pumping elements will be driven toward induction points 460 of primary stage pumping elements 454 and then on to termination points 458 and into the lubricant side of seal 420. The open ends 474 of second set 470 of secondary stage pumping elements may allow some lubricant therein to escape. Thus, in the fifth preferred embodiment, all of the advantages of the second, third and fourth preferred embodiments may not be realized.

Figure 8A:
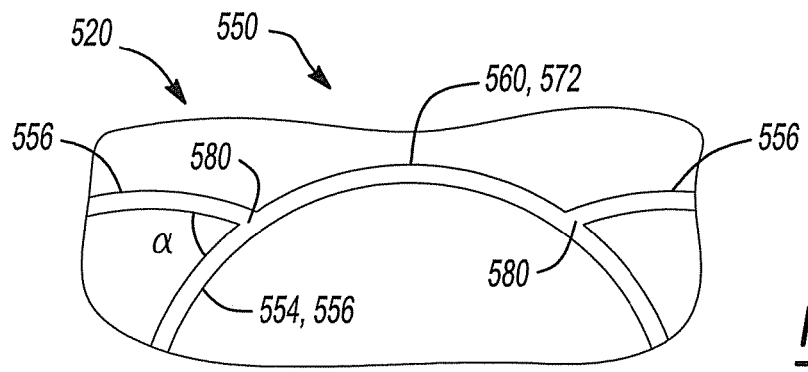
FIGS. 8A and B are schematic simplified representations of a portion of a top plan view of the active surface of the seal of FIG. 1 showing alternate arrangements for the connecting of the pumping elements in the primary and secondary stages and/or in the various sets of secondary stage pumping elements.
Figure 8B:
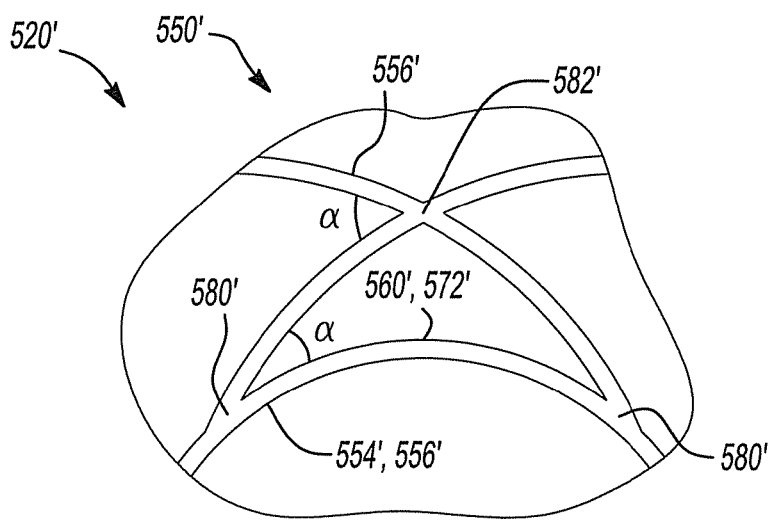

Referring now to FIGS. 8A and 8B, alternate arrangements for the interconnection of secondary stage pumping elements 556 with other secondary stage pumping elements 556 and/or primary stage pumping elements 554 is shown. In the preceding preferred embodiments, the intersection of pumping elements resulted in a termination point of one pumping element corresponding to an induction point of the pumping element into which the captured lubricant is directed. In the embodiment shown in FIG. 8A the secondary stage pumping elements 556 are shown as having termination points 580 that interconnect with a primary stage pumping element 554 and/ or a closer in secondary stage pumping element 556 at locations other than the respective induction points 560, 572. In these alternate embodiments, lubricant within the secondary stage pumping elements 556 are transferred to primary stage pumping elements 554 or other closer in secondary stage pumping elements 556 for subsequent transfer to primary stage pumping elements 554. Again, to facilitate the smooth transfer of lubricant between the various pumping elements, it is preferred that the intersection angle α be an acute angle noticeably greater than zero degrees.

Referring now to FIG. 8B, a second alternate configuration for the interconnection of secondary stage pumping elements 556' with other secondary stage pumping elements 556' or primary stage pumping elements 554' is shown. In this alternate arrangement, the secondary stage pumping elements 556' again have termination points 580' that interconnect with either primary stage pumping elements 554' or closer in secondary stage pumping elements 556' at locations other than their respective induction points 560', 572'. Additionally, the secondary stage pumping elements 556' intersect one another at an intersection point 582' prior to termination points 580'. Lubricant captured within secondary stage pumping elements 556' is transferred to primary stage pumping elements 554', or other closer in secondary stage pumping elements 556' for subsequent transfer to primary stage pumping elements 554'. To facilitate the smooth transfer of lubricant between the pumping elements 550', it is preferred that the intersection angle α be an acute angle noticeably greater than zero degrees. It should be appreciated that the alternate configurations shown in FIGS. 8A and 8B for pumping elements 550, 550' can be utilized in whole or in part with the various preferred embodiments.

Figure 9:
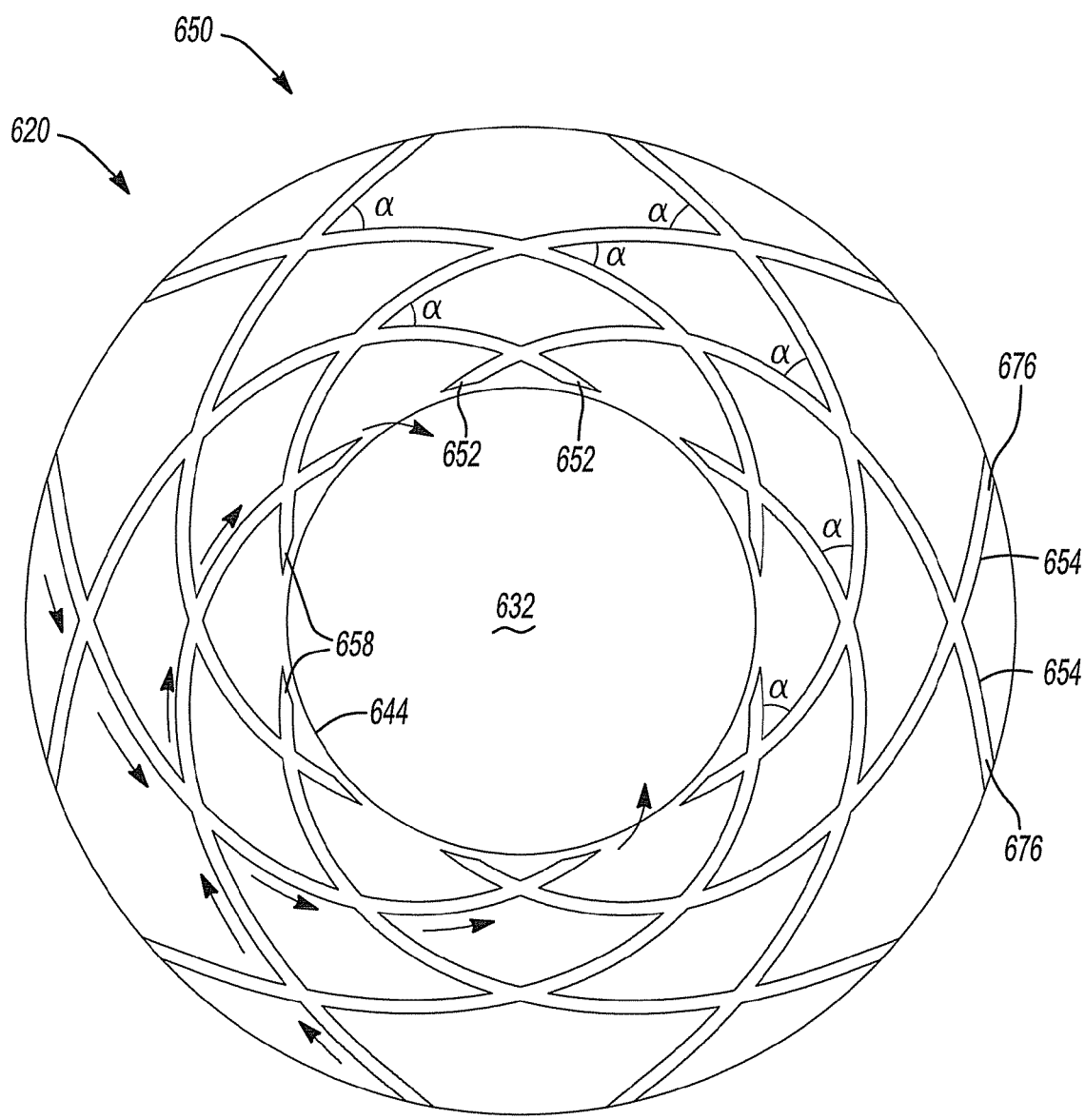
FIG. 9 is a schematic simplified representation of a top plan view of the active surface of the seal of FIG. 1 showing the sixth preferred embodiment of the bi-directional pattern on the active surface of the seal.

Referring now to FIG. 9, a bi-directional pattern of pumping elements 650 for seal 620 according to a sixth preferred embodiment of the present invention is shown. In the sixth preferred embodiment, only primary stage pumping elements 654 are utilized. The primary stage pumping elements 654 include a plurality of helically or spirally-extending pumping elements that extend from termination points 658 adjacent static dam 652 and seal edge 644 to open ends 676. Primary stage pumping elements 654 can extend less than or more than an entire circumference of central opening 632 when extending from termination points 658 to open ends 676. One half of the primary stage pumping elements 654 extend clockwise while the other half of primary stage pumping elements 654 extend counter clockwise around central opening 632 to thereby provide bi-directional pumping of lubricant therein. The angle α at which primary stage pumping elements 654 intersect one another is preferably an acute angle noticeably greater than zero degrees to facilitate the fluid transfer straight through the intersection. Preferably, the height (in the case of ribs) or cross-sectional area (in the case of grooves) decreases to zero as the primary stage pumping elements 654 approach termination points 658. This results in an increasing fluid pressure as the lubricant approaches termination points 658 and facilitates the liftoff of static dam 652 and seal edge 644 and the return of lubricant to lubricant side 648 of seal 620. Again, the use of open ends 676 may result in some lubricant escaping. Thus, all of the benefits of some of the other preferred embodiments may not be realized in the fifth preferred embodiment.

Figure 10:
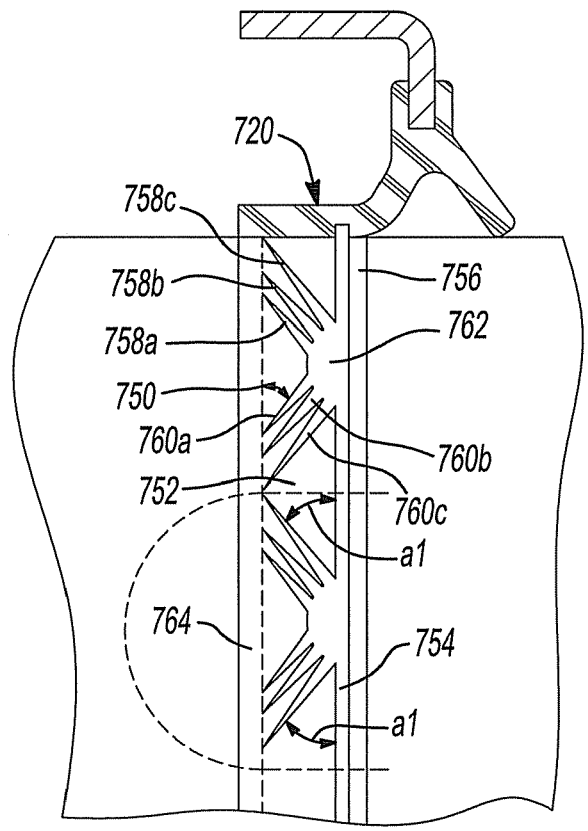
FIG. 10 is a schematic simplified representation of a plan view of the active surface of the seal of FIG. 1 showing a seventh embodiment of the bi-directional pattern on the active surface of the seal.

With reference to FIG. 10, a bi-directional pattern for pumping elements 750 for a lay down seal 720 according to a seventh embodiment, is shown. In FIG. 10, the seal 720 includes an active surface 752 having a circumferential groove 754 disposed on the air side of the active surface 752. A first static dam 756 is disposed adjacent to the circumferential groove 754. A plurality of repeating patterns of angular grooves 758a-c and 760a-c extend from a corresponding inner shore 762 which extends axially from the circumferential groove. The inner shore 762 includes a recessed region generally having a depth approximately equal to a depth of the circumferential groove 754, although other depths can be used. The angular grooves 758a-c each have a positive approach angle a1 and the angular grooves 760a-c each have a negative approach angle –a1 relative to the circumferential groove 754. The approach angles are selected to have a desired pumping effect and can be smaller than, or equal to, 90 degrees. Angles between 30 and 60 degrees are shown. Each of the angular groves 758a-c have a different length as they each extend from a different point on the inner shore 762. The closer the groove is to the axis of symmetry, the progressively shorter they are. Similarly, the angular grooves 760a-c also each have different lengths. A second static dam 764 is provided at the distal end of the angular grooves 758a-c and 760a-c and thereby forms a sealing edge. The circumferential groove 754 serves as an accumulator of the oil that gets past the second static dam 764. The angular grooves 758a-c, 760a-c produce pumping action in the direction of the oil side. Variable lengths of grooves 758a-c, 760a-c allow for preventing the potential overflow of the circumferential groove 754 with escaped oil. By varying the approach angle a1, –a1, a net "in" pumping (pumping toward the oil side) can be generated at a prescribed amount. The maximum "in" pumping will take place at an approach angle greater than 45 degrees.

Figure 11:
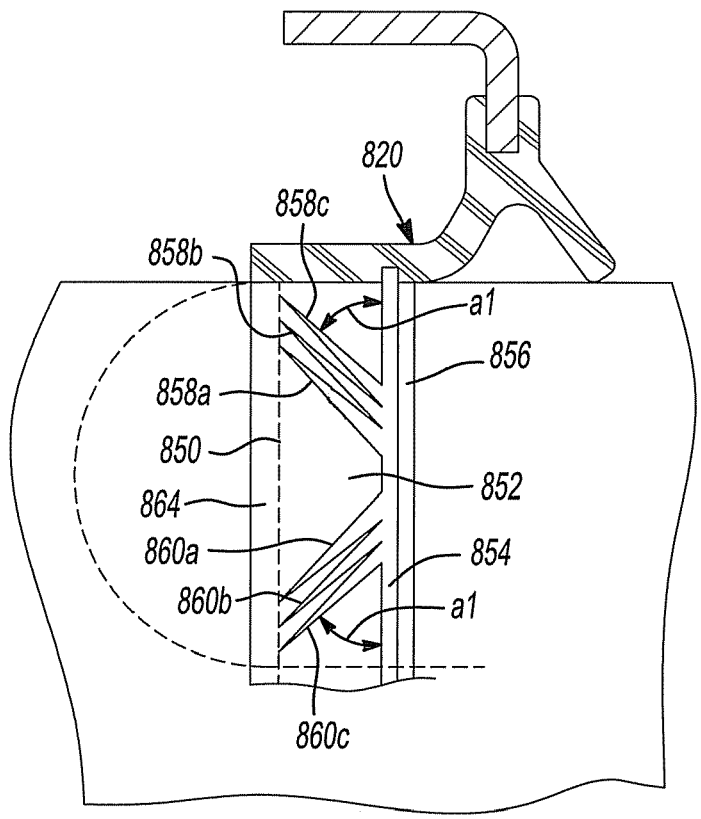
FIG. 11 is a schematic simplified representation of a plan view of the active surface of the seal of FIG. 1 showing an eighth embodiment of the bi-directional pattern on the active surface of the seal.

With reference to FIG. 11, a bi-directional pattern for pumping elements 850 for a lay down seal 820 according to a eighth embodiment, is shown. In FIG. 11, the seal 820 includes an active surface 852 having a circumferential groove 854 disposed on the air side of the active surface 852. A first static dam 856 is disposed adjacent to the circumferential groove 854. A plurality of repeating patterns of angular grooves 858a-c and 860a-c extend symmetrically from the circumferential groove 854. The angular grooves 858a-c, 860a-c include recessed regions generally having a depth approximately equal to a depth of the circumferential groove 854, although other depths can be used. The angular grooves 858a-c each have a positive approach angle a1 and the angular grooves 860a-c each have a negative approach angle −a1 relative to the circumferential groove 854. The approach angles are selected to have a desired pumping effect and can be greater than 45 degrees. Each of the angular groves 858a-c, 860a-c generally have a the same length as they each extend from the circumferential groove 854 and terminate at a second static dam 864 that is provided at the distal end of the angular grooves 858a-c and 860a-c and thereby forms a sealing edge.

Figure 12:
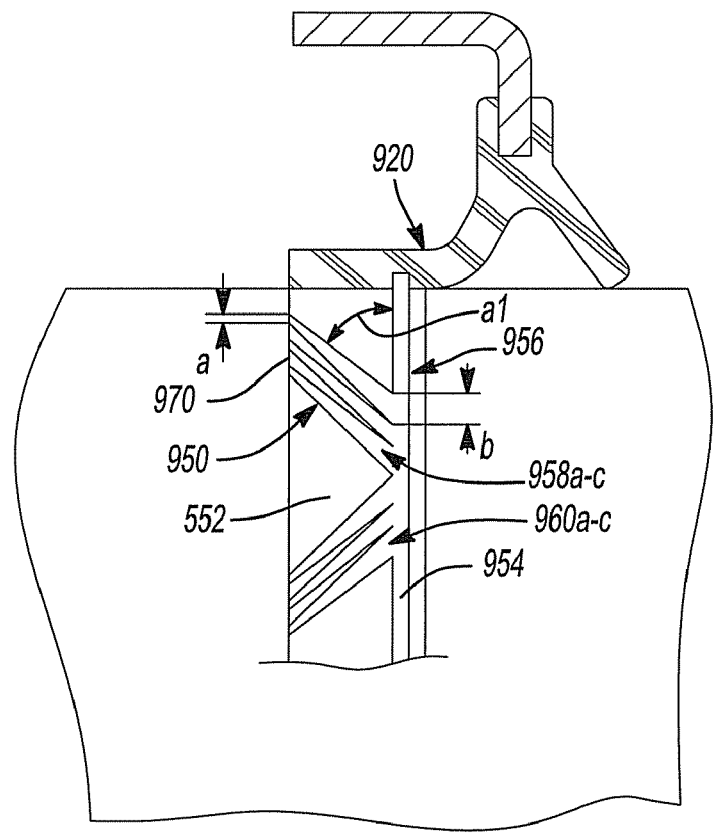
FIG. 12 is a schematic simplified representation of a plan view of the active surface of the seal of FIG. 1 showing a ninth embodiment of the bi-directional pattern on the active surface of the seal.

With reference to FIG. 12, a bi-directional pattern for pumping elements 950 for a lay down seal 920 according to a ninth embodiment, is shown. In FIG. 12, the seal 920 includes an active surface 952 having a circumferential groove 954 disposed on the air side of the active surface 952. A first static dam 956 is disposed adjacent to the circumferential groove 954. A plurality of repeating patterns of angular grooves 958a-c and 960a-c extend symmetrically from the circumferential groove 954. The angular grooves 958a-c, 960a-c include recessed regions generally having a depth approximately equal to a depth of the circumferential groove 954, although other depths can be used. The angular grooves 958a-c each have a positive approach angle a1 and the angular grooves 960a-c each have a negative approach angle −a1 relative to the circumferential groove 954. The approach angles are selected to have a desired pumping effect and can be greater or less than 45 degrees. Each of the angular groves 958a-c, 960a-c generally have the same length as they each extend from the circumferential groove 954 and terminate at a second common spaced location that is provided at the distal end of the angular grooves 958a-c and 960a-c. The embodiment of FIG. 12 differs from the embodiment of FIG. 11 in that the second static dam has been removed so that the angular grooves 958a-c, 960a-c extend through the sealing edge 970. The "out" pumping (pumping toward the air side) is controlled by the cross-sectional area "a" of the grooves at the sealing edge being small. The oil "in" pumping (pumping toward the oil side) is controlled by the larger cross-sectional area "b" where the angular grooves 958a-c, 960a-c merge with the circumferential groove 954. Since the area "a" is smaller than the area "b", the net "in" pumping is always positive.

Figure 13:
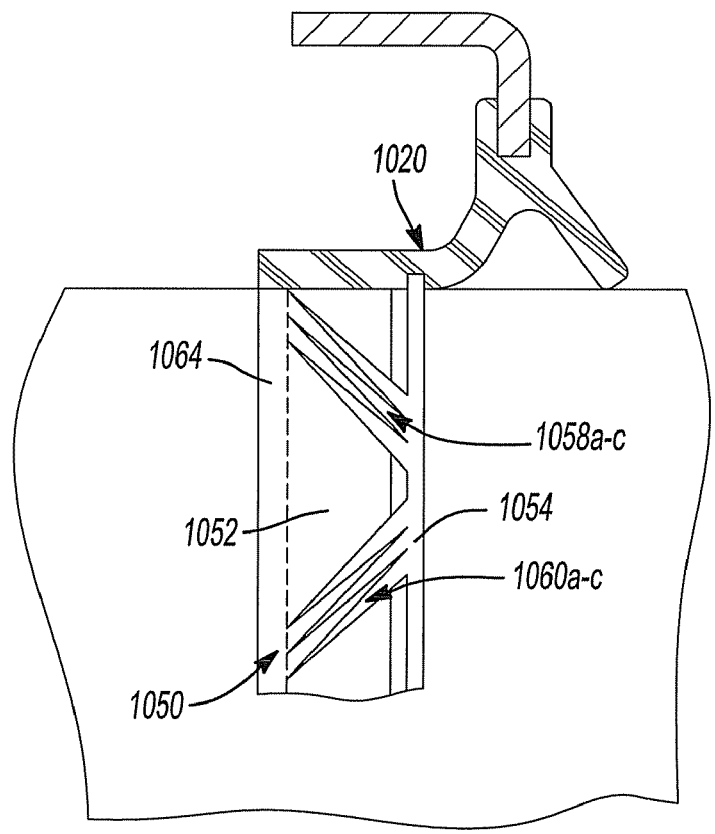
FIG. 13 is a schematic simplified representation of a plan view of the active surface of the seal of FIG. 1 showing a tenth embodiment of the bi-directional pattern on the active surface of the seal.

With reference to FIG. 13, a bi-directional pattern for pumping elements 1050 for a lay down seal 1020 according to a tenth embodiment, is shown. In FIG. 13, the seal 1020 includes an active surface 1052 having a circumferential groove 1054 disposed on the air side of the active surface 1052. No static dam is disposed adjacent to the circumferential groove 1054. A plurality of repeating patterns of angular grooves 1058a-c and 1060a-c extend symmetrically from the circumferential groove 1054. The angular grooves 1058a-c, 1060a-c include recessed regions generally having a depth approximately equal to a depth of the circumferential groove 1054, although other depths can be used. The angular grooves 1058a-c each have a positive approach angle a1 and the angular grooves 1060a-c each have a negative approach angle −a1 relative to the circumferential groove 1054. The approach angles are selected to have a desired pumping effect and can be greater than 45 degrees. Each of the angular groves 1058a-c, 1060a-c generally have a same length as they each extend from the circumferential groove 1054 and terminate at a static dam 1064 that is provided at the distal end of the angular grooves 1058a-c and 1060a-c thereby forming a sealing edge.

In each of the embodiments shown in FIGS. 10, 11 and 13, each angular groove can have a cross-sectional area maximum at the point where the angular groove merges with the circumferential groove and reducing to zero at the static dam. Further, it should be understood that features of one embodiment can be combined with other embodiments.

The seal according to the principles of the present invention can be made from a variety of material compositions. For example, the dynamic seal can include plastic, rubber or any of a wide variety of known elastomers, such as PTFE, TPE (thermoplastic elastomers), TPV (thermoplastic vulcanizers), and Flouroprene™ material, a composition described in U.S. Pat. No. 6,806,306, among others.

Thus, a seal utilizing one of the bi-directional patterns for its pumping elements advantageously captures lubricant that leaks past the seal edge and returns the lubricant to the lubricant side of the seal. The use of symmetrical pumping elements provides a substantially equal pumping capability regardless of the direction of relative rotation between the seal and the shaft. Additionally, the use of a static dam allows for lubrication of the contacting portion of the static dam with each discharge of lubricant back into the lubricant side of the seal. The use of secondary stage pumping elements advantageously provides additional capabilities in the event that lubricant leaks past the first stage of pumping elements.

While the present invention has been described and illustrated with reference to specific embodiments, it should be appreciated that these embodiments are merely exemplary in nature and that variations that depart from the embodiments shown are intended to be within the scope of the present invention. For example, the arcuate shapes of the various pumping elements can be different than that shown. Moreover, the arcuate shape can change as the pumping elements extend along the active surface such that a constant arcuate shape is not required. Furthermore, the pumping elements can extend more or less around the central opening than shown. Additionally, the number of pumping elements that form each stage can differ from that shown. Thus, variations that do not depart from the gist of the invention are intended to be within the scope of the invention. Such variations are not to be regarded as a departure from the spirit and scope of the invention.

What is claimed is:

1. A bi-directional seal for sealing against a shaft, comprising:

a lay down lip having a leading seal edge and an active surface for engaging the shaft, said active surface including an annular circumferential groove extending into said active surface away from the shaft and a plurality of angular grooves extending into said active surface away from the shaft, said plurality of angular grooves extending from said annular circumferential groove toward a liquid side of the seal, said circumferential groove being at a substantially constant distance from said leading seal edge as said circumferential groove extends annularly, said plurality of angular grooves including a repeating pattern of angular grooves with each pattern having a plurality of immediately adjacent angular grooves with a positive approach angle without grooves having a negative approach angle therebetween and a plurality of immediately adjacent angular grooves with a negative approach angle without grooves having a positive approach angle therebetween, wherein within each pattern of angular grooves said plurality of grooves with a positive approach angle and said plurality of grooves with a negative approach angle approach one another as said grooves extend toward said annular circumferential groove.

2. The seal according to claim 1, wherein said active surface includes an annular static dam disposed adjacent to said circumferential groove.

3. The seal according to claim 2, wherein said static dam is disposed between said repeating pattern of angular grooves and an air side of said active surface.

4. The seal according to claim 1, wherein said active surface includes a pair of annular static dams on opposite ends of said active surface, said plurality of angular grooves is between said pair of annular static dams, and each one of said angular grooves extends in its entirety along said active surface from said annular circumferential groove toward said liquid side without entirely circumscribing the shaft.

5. The seal according to claim 4, wherein said circumferential groove is disposed between said pair of annular static dams.

6. The seal according to claim 1, wherein each groove in said plurality of angular grooves has a same length.

7. The seal according to claim 1, wherein said active surface includes an annular static dam provided at a tip of each said angular groove between said plurality of angular grooves and said liquid side, and each one of said angular grooves extends in its entirety along said active surface from said annular circumferential groove toward said liquid side without entirely circumscribing the shaft.

8. The seal according to claim 7, wherein each of said angular grooves has a first width adjacent said circumferential groove and a second, narrower width adjacent said static dam.

9. The seal according to claim 1, wherein each of said angular grooves has an approach angle with said circumferential groove of at least 45 degrees.

10. The seal according to claim 1, wherein said angular grooves have a cross-sectional area that decreases as said grooves extend toward said liquid side of said active surface.

11. The seal according to claim 1, wherein said angular grooves open into said liquid side of said active surface.

12. The seal according to claim 1, wherein said circumferential groove is disposed between said repeating pattern of angular grooves and an air side of said active surface.

13. The seal according to claim 1, wherein said angular grooves extend from said circumferential groove along said active surface toward said liquid side in their entirety without intersecting one another.

14. The seal according to claim 1, wherein said annular circumferential groove is disposed between an air side of the seal and said angular grooves.

15. The seal according to claim 1, wherein each one of said angular grooves is open toward the shaft as each one of said angular grooves extends in its entirety along said active surface.

16. The seal according to claim 1, wherein each one of said angular grooves forms a discrete contiguous uninterrupted singular flow path along its entirety from said annular circumferential groove toward said liquid side.

17. A bi-directional seal for sealing against a shaft, comprising:

a lay down lip having an active surface for engaging the shaft, said active surface including an annular circumferential groove extending into said active surface away from the shaft and a plurality of non-intersecting angular grooves extending into said active surface away from the shaft, each one of said angular grooves extending from said circumferential groove along said active surface toward a liquid side of the seal in its entirety without intersecting any other grooves on said active surface, said plurality of angular grooves including a repeating pattern of angular grooves with each pattern having a plurality of angular grooves with a positive approach angle and a plurality of angular grooves with a negative approach angle, and each one of said angular grooves being open toward the shaft as each one of said angular grooves extends in its entirety along said active surface, wherein in each pattern, each of said plurality of angular grooves having a positive approach angle has a different length, and within each pattern of angular grooves said plurality of grooves with a positive approach angle and said plurality of grooves with a negative approach angle approach one another as said grooves extend toward said annular circumferential groove.

18. The seal according to claim 17, wherein in each pattern each of said plurality of angular grooves having a negative approach angle has a different length.

19. The seal according to claim 17, wherein said annular circumferential groove is disposed between an air side of the seal and said angular grooves.

20. The seal according to claim 17, wherein said circumferential groove is at a substantially constant distance from said lip as said circumferential groove extends annularly.

21. The seal according to claim 17, wherein each one of said angular grooves forms a discrete contiguous uninterrupted singular flow path along its entirety from said annular circumferential groove toward said liquid side.

22. A bi-directional seal for sealing against a shaft, comprising:

a lay down lip having an active surface for engaging the shaft, said active surface including a circumferential groove and a plurality of angular grooves extending from said circumferential groove, said plurality of angular grooves including a repeating pattern of angular grooves with each pattern having a plurality of angular grooves with a positive approach angle and a plurality of angular grooves with a negative approach angle, wherein each pattern includes a shore axially extending from said circumferential groove, said shore having a radially recessed portion discrete from said grooves, and each of said angular grooves communicating with said recess portion.

23. A bi-directional seal for sealing against a shaft, comprising:

a lay down lip having an active surface for engaging the shaft, said active surface including an annular circumferential groove extending into said active surface away from the shaft and a plurality of non-intersecting angular grooves extending into said active surface away from the shaft, each one of said angular grooves extending from said circumferential groove along said active surface toward a liquid side of the seal in its entirety without intersecting any other grooves on said active surface, said plurality of angular grooves including a repeating pattern of angular grooves with each pattern having a plurality of angular grooves with a positive approach angle and a plurality of angular grooves with a negative approach angle, and each one of said angular grooves being open toward the shaft as each one of said angular grooves extends in its entirety along said active surface, wherein said plurality of angular grooves with a positive approach angle in at least one of said pattern of grooves all extend from a common area of said circumferential groove toward said liquid side.

24. The seal according to claim 23, wherein said circumferential groove is at a substantially constant distance from said lip as said circumferential groove extends annularly.

25. The seal according to claim 23, wherein each one of said angular grooves forms a discrete contiguous uninterrupted singular flow path along its entirety from said annular circumferential groove toward said liquid side.

26. The seal according to claim 23, wherein said active surface includes a static dam between said liquid side of the seal and said angular grooves, and each one of said angular grooves extends in its entirety along said active surface toward said liquid side without entirely circumscribing the shaft.

27. A seal for sealing against a shaft, comprising:
a lay down lip having an active surface for engaging the shaft, said active surface including an annular circumferential groove extending into said active surface away from the shaft and a plurality of angular grooves extending into said active surface away from the shaft, said plurality of angular grooves extending from said annular circumferential groove toward a liquid side of the seal, said plurality of angular grooves including a repeating pattern of angular grooves with each pattern having a plurality of immediately adjacent angular grooves with a positive approach angle and a plurality of immediately adjacent angular grooves with a negative approach angle,
wherein said angular grooves terminate prior to reaching said liquid side, each one of said angular grooves extends in its entirety along said active surface from said annular circumferential groove toward said liquid side without entirely circumscribing the shaft, and within each pattern of angular grooves said plurality of grooves with a positive approach angle and said plurality of grooves with a negative approach angle approach one another as said grooves extend toward said annular circumferential groove.

28. The seal according to claim 27, wherein said active surface includes an annular static dam disposed between said repeating pattern of angular grooves and said fluid side.

29. The seal according to claim 28, wherein said circumferential groove is disposed between said repeating pattern of angular grooves and an air side of said active surface.

30. The seal according to claim 27, wherein said circumferential groove is at a substantially constant distance from said lip as said circumferential groove extends annularly.

31. The seal according to claim 27, wherein each one of said angular grooves forms a discrete contiguous uninterrupted singular flow path along its entirety from said annular circumferential groove toward said liquid side.

32. The seal according to claim 27, wherein each one of said angular grooves is open toward the shaft as each one of said angular grooves extends in its entirety along said active surface.

33. A bi-directional seal for sealing against a shaft, comprising:
a lay down lip having an active surface for engaging the shaft, said active surface including an annular circumferential groove extending into said active surface away from the shaft and a plurality of angular grooves extending into said active surface away from the shaft, said plurality of angular grooves extending from said circumferential groove, said plurality of angular grooves including a repeating pattern of angular grooves with each pattern having a plurality of adjacent angular grooves with a positive approach angle and a plurality of adjacent angular grooves with a negative approach angle,
wherein within each pattern of angular grooves said plurality of grooves with a positive approach angle and said plurality of grooves with a negative approach angle approach one another as said grooves extend toward said annular circumferential groove, and said circumferential groove is at a substantially constant distance from said lip as said circumferential groove extends annularly.

34. The seal according to claim 33, wherein said annular circumferential groove is disposed between an air side of the seal and said angular grooves.

35. The seal according to claim 33, wherein each one of said angular grooves forms a discrete contiguous uninterrupted singular flow path along its entirety from said annular circumferential groove toward said liquid side.

* * * * *